United States Patent
Brown et al.

[15] 3,693,552
[45] Sept. 26, 1972

[54] CART STRUCTURE FOR DRAGLINE SYSTEMS

[72] Inventors: Joseph L. Brown; Neil N. Brown, both of Charlotte, N.C.

[73] Assignee: Brown Truck and Trailer Manufacturing Company, Charlotte, N.C.

[22] Filed: May 28, 1971

[21] Appl. No.: 147,889

[52] U.S. Cl. .............................. 104/172 BT, 104/88
[51] Int. Cl. ............................................. B61b 9/00
[58] Field of Search .................. 104/88, 172, 172 BT

[56] References Cited

UNITED STATES PATENTS

| | | | |
|---|---|---|---|
| 3,094,944 | 6/1963 | Bradt et al. | 104/172 BT |
| 3,103,895 | 9/1963 | Bradt et al. | 104/88 |

Primary Examiner—Gerald M. Forlenza
Assistant Examiner—Frank E. Werner
Attorney—Channing L. Richards, Dalbert U. Shefte, Francis M. Pickney and Richards & Shefte

[57] ABSTRACT

A cart structure is provided for dragline systems of the sort now commonly employed for material handling in freight terminals and industrial warehouses. The cart structure features an improved arrangement for related mounting of the dragline engaging drop pin and the switch actuating probe or probes, by which the latter may be lowered and latched in position for switch actuation whenever the drop pin has been lowered for dragline engagement, but are released to an upward retracted position and conditioned against lowered latching whenever the drop in is raised to disengage the dragline.

5 Claims, 10 Drawing Figures

INVENTORS
JOSEPH L. BROWN &
NEIL N. BROWN
BY
Richards & Shefte
ATTORNEYS

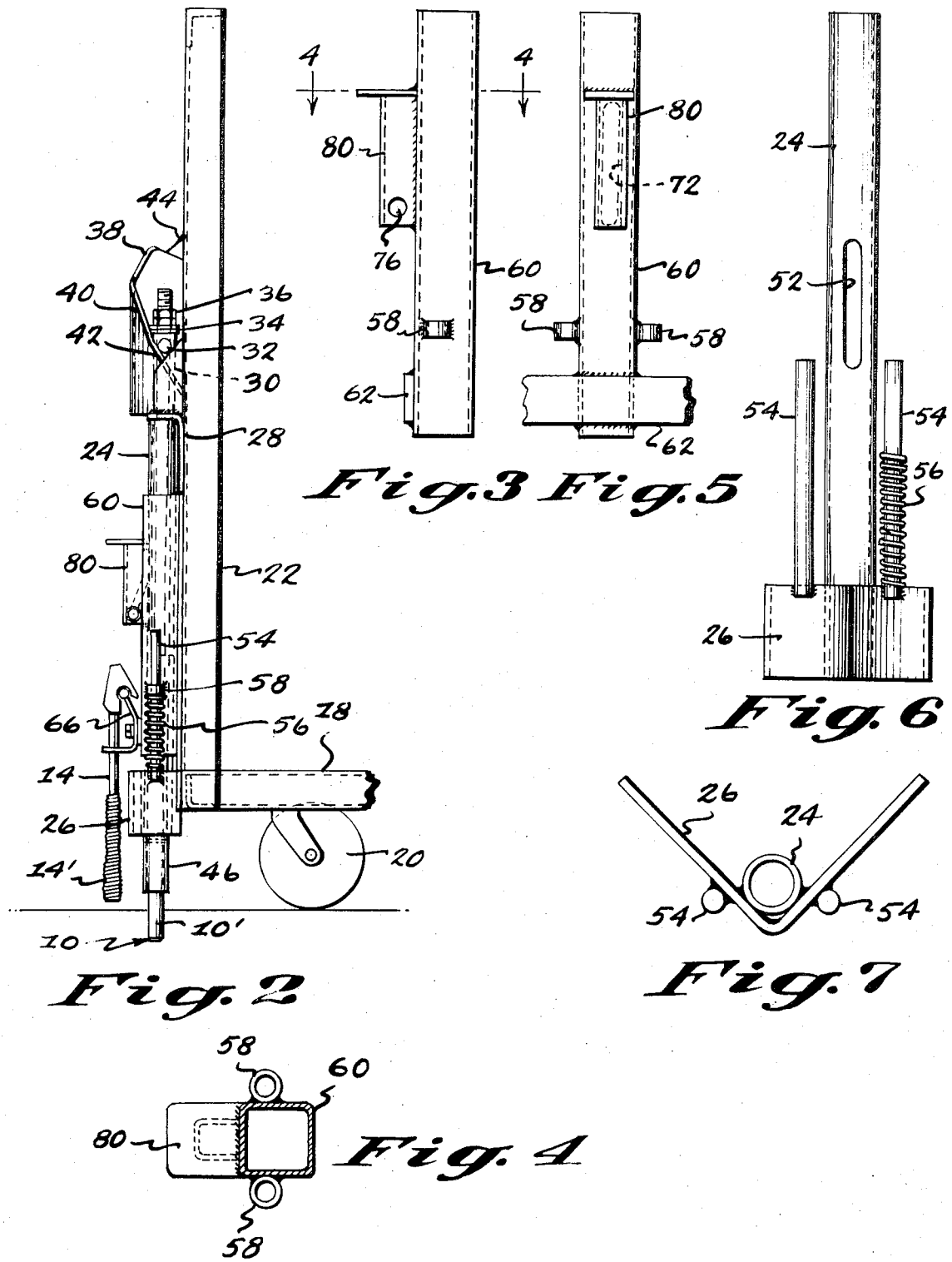

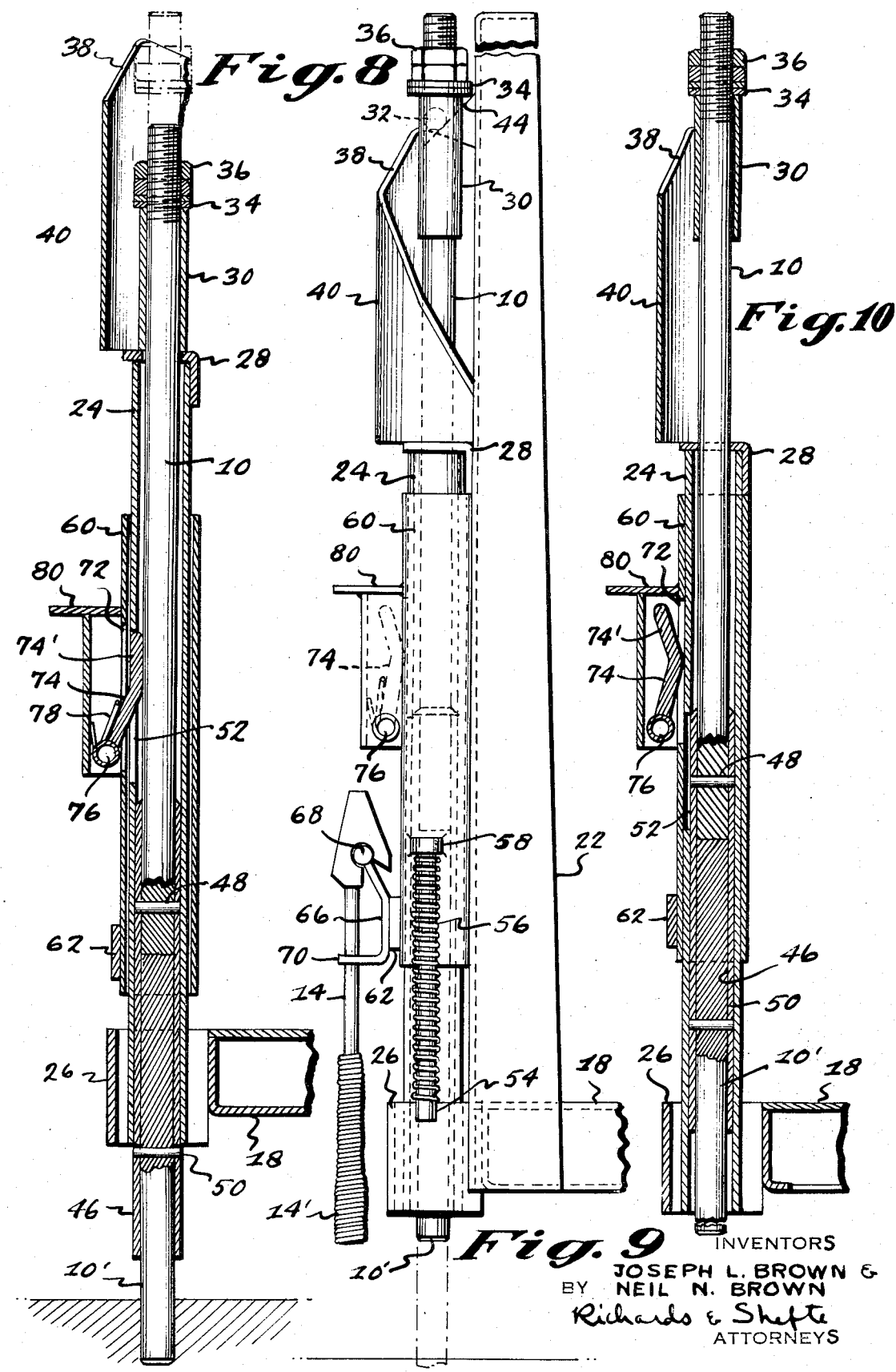

CART STRUCTURE FOR DRAGLINE SYSTEMS

BACKGROUND OF THE INVENTION

Dragline systems have been employed for a number of years in freight terminals and industrial warehouses, and even in manufacturing plants, in order to mechanize and render as automatic as possible the material handling that must take place therein. Such systems basically comprise an in-floor dragline installed beneath a floor slot, and a plurality of carts equipped with so-called drop pin that may be lowered through the floor slot to engage the dragline so as to be drawn along and guided by the floor slot from one point to another in the system.

As use of these dragline systems increased, a trend developed toward arranging them with automatic switching capability, so that any particular cart could be removed from the line at any pre-selected location, or switched between related dragline systems, in order to fit the material handling requirements of given situations more readily and also to reduce substantially the manual attention needed in operating the system properly. Prior U.S. Pat. No. 3,078,810, No. 3,103,183 and No. 3,262,397 are examples of patent activity related to the provision of switching capability in these systems.

Initially, as shown by the foregoing prior patents, the switching was provided for by additionally equipping the cart with mechanical probes positioned selectively for striking switch-actuating abutments at desired locations. More recently, a magnetic type of probe has come into use that eliminates the need for, and a good many disadvantages of, mechanical contact in actuating the switches.

The improved cart structure of the present invention is described further below in relation to a magnetic probe system, although it is applicable to a mechanical probe arrangement as well, and in either case it provides for retracting the probe or probes in a particular effective manner along with the drop pin to avoid probe damage when the carts are removed from the dragline system for separate handling at loading docks, or other locations, at which material carried by the carts is to be transferred for some purpose.

SUMMARY OF THE INVENTION

Briefly described, the cart structure of the present invention is provided with a guide tube, fixed uprightly thereon, in which the dragline drop pin is positioned for lowering to engage the dragline and raising to retract it. Slidably disposed around this guide tube is a control tube on which means for carrying the switch-actuating probe or probes is fixed, and this control tube is biased toward an upward position at which the probes are retracted. Provision is made for depressing the control tube against the bias thereon to a lowered position and for latching is thereat to present the probes for switch actuation, and the latching arrangement is such that the control tube is released to retract the probes whenever the drop pin is raised and lowered position latching of the control tube is prevented unless the drop pin has been lowered.

The result of this arrangement is to provide for lowering and raising of the probes independently of the drop pin, so that the drop pin is left free for easy manipulation, while at the same time insuring that the probes cannot be left at, or returned to, their operative latched condition whenever the cart structure has been removed from the dragline system.

DESCRIPTION OF THE DRAWINGS

FIG. 2 is a partial right side elevation of the FIG. 1 cart structure;

FIG. 3 is a side elevation detail of the probe control tube;

FIG. 4 is a section detail taken substantially at the line 4—4 in FIG. 3;

FIG. 5 is a further detail of the probe control tube as seen from the left in FIG. 3;

FIG. 6 is an elevation of the drop pin guide tube;

FIG. 7 is a top plan view corresponding to FIG. 6;

FIG. 8 is a sectional detail of the assemblied guide and control tubes with the drop pin shown lowered and the control tube latched at lowered position;

FIG. 9 is a further side elevation corresponding generally to FIG. 2, but showing the drop pin raised and the control tube retracted; and FIG. 10 is a sectional detail corresponding generally to FIG. 9.

DESCRIPTION OF THE PREFERRED EMBODIMENT

Figure 1:
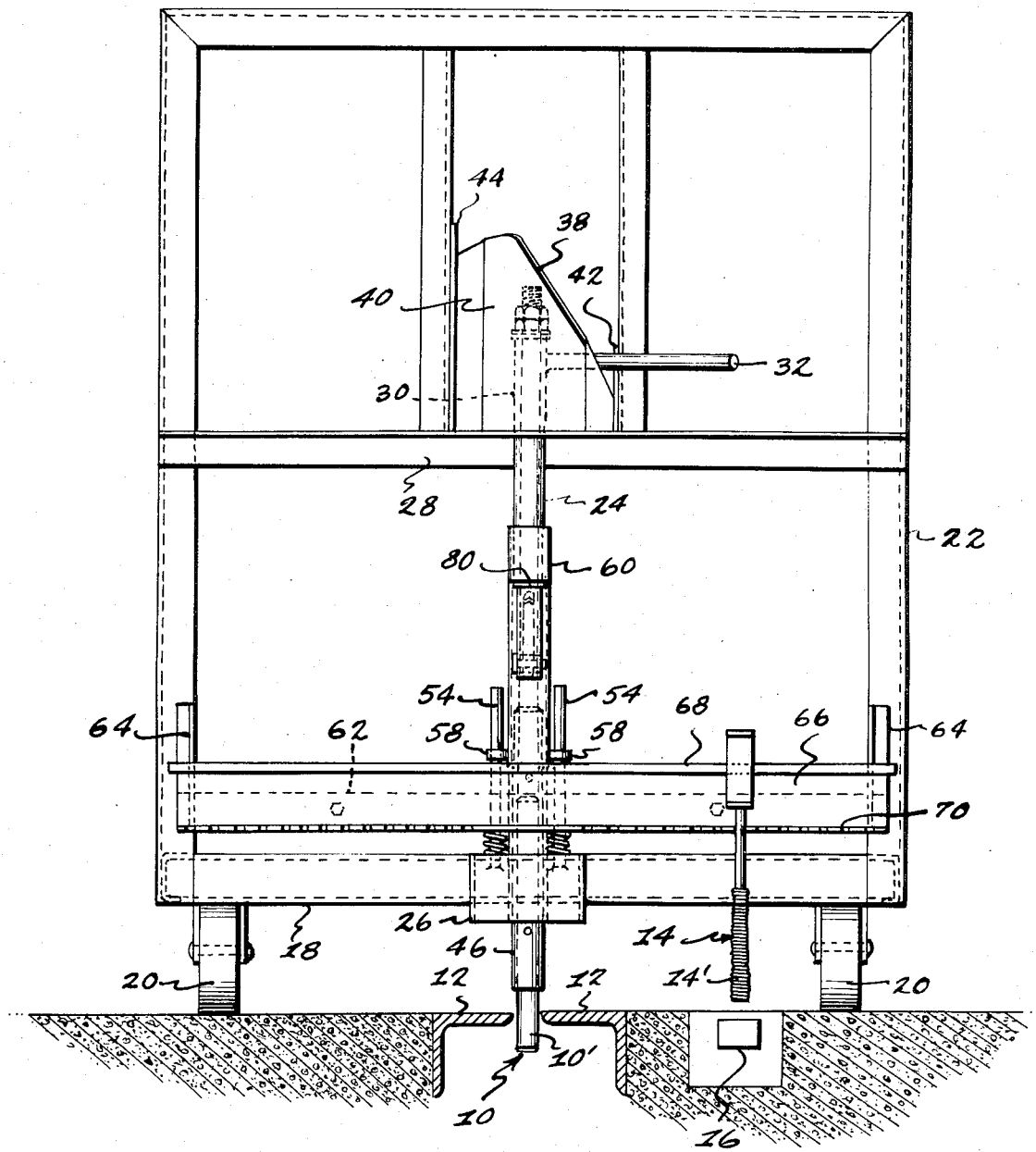
FIG. 1 is a front end view of a cart structure embodying the present invention.

FIG. 1 of the drawings indicates generally the manner in which a cart structure is engaged for operation in a dragline system, a drop pin 10 being shown lowered through a floor slot formed between floor-installed flanges 12 that also serve to house the dragline (not shown), a lowered probe also being shown at 14 in the relation it must assume upon reaching a floor-installed switch 16 for activating the same to divert the drop pin 10 to a shunt slot (not shown) at a desired switching location.

The cart structure body may take any of a variety of forms. Suitably and representatively, it is formed (compare FIGS. 1 and 2) with a load carrying bed 18 supported on wheels 20 in front and back pairs of which the front pair should be caster-type in order to provide for following in the direction dictated by the floor-slot guidance, and with upright framing 22 at its front end on which the drop pin 10 and probe 14 are arranged for lowering and raising as the cart structure is engaged with and removed from the dragline system.

For such lowering and raising, the drop pin 10 is positioned in a guide tube 24, the form of which is detailed in FIGS. 6 and 7, and which is fixed to the cart structure so that it extends vertically and centrally at the front side of the front end framing 22. Fixing of the guide tube 24 is effected through a lower end bracket 26 that is attached by welding at the front edge of the cart bed 18, and by similar upper end attachment at an angle crosspiece 28 forming part of the front end framing 22. The horizontal flange of crosspiece 28 is bored to receive the drop pin 10 slidably at its base diameter so that the pivot sleeve portion 30 of a manipulating handle 32 is trapped thereabove beneath washers 34 and lock nuts 36 at the upper end of drop pin 10. The manipulating handle 32 extends from the pivot sleeve portion 30 to ride and reach beyond the contoured upper edge 38 of a concave cam plate 40 that is installed on the framing 22 above crosspiece 28. Abutment strips 42 and 44 are additionally installed at each side of the cam plate 40, and the contour of the upper cam plate edge 38 is such as to guide the manipulating handle 32 through an arc of 180° between gravity-biased alternate positions of rest at the abutment strips 42 and 44, which define respective lowered and raised positions of drop pin 10 as the manipulating handle is manually shifted to one position or the other.

Below crosspiece 28 the drop pin 10 extends downwardly in spaced concentric relation within guide tube 24 to carry a sleeve 46 that slidably fits the inner diameter of guide tube 24. In the embodiment illustrated, sleeve 46 is sufficiently elongated to house and support a replaceable lower-end wear tip portion 10' of drop pin 10 (see FIGS. 8 and 10). For this purpose, the sleeve 46 is attached to drop pin 10 adjacent its lower end by an assembly pin at 48, and to the wear tip portion 10' midway of its length by similar pinning at 50, so that wear tip portion 10' can be reversed readily before replacement is needed as well as being provided initially in a wear-resistant form. Alternatively, if it is desired instead to provide the drop pin 10 in the simpler form of a continuous rod, it is fitted with a relatively short collar (not shown) at a position corresponding to that of a similar upper end portion of sleeve 46, and the lower end of guide tube 24 is fitted with a bushing (not shown) to center and support the drop pin 10 there.

In either event, the upper edge of sleeve 56 (or of the alternative collar) is preferably chamfered, and is positioned so as to be displaced below an elongated lengthwise slot 52 in guide tube 24 when the drop pin 10 is at lowered position, and to rise in blocking relation at this slot 52 when the drop pin 10 is at raised position, suitably the extent of rise is just above the upper end of slot 52 in the latter case. Additionally, the lower end bracket 26 of guide tube 24 has a pair of upstanding guide pins 54 mounted thereon to carry bias springs 56 above which ring lugs 58 carried by a control tube 60 are received. The control tube 60 is slidably telescoped on the guide tube 24 and is restricted against rotation with respect thereto by the guide pins 54 as well as being normally maintained at a raised position by the bias springs 56 carried by the pins 54, the raised position of control tube 60 being determined by abutment of its upper end at the lower edge of the depending flange of framing crosspiece 28 (see FIGS. 9 and 10).

Control tube 60 is provided to present or retract the previously mentioned switch-actuating probes 14, and for this purpose it has a mounting bar 62 fixed adjacent its lower end that extends across the framing 22 to ride the extending flange edge of angle guides 64 fixed adjacent the bottom of each framing corner post (see FIG. 1) to support the mounting bar 62 slidably adjacent each end and thereby maintain it aligned crosswise of the cart front. Bolted to this mounting bar 62 is a coextensive probe bracket 66 having a round bar 68 attached at its top edge on which as many probes 14 as needed are hung as shown, and along which they may be slid for selective transverse positioning at a particular open-ended slot of a spaced series in the extending edge portion of a lower horizontal flange 70 formed on the probe bracket 66.

The probe 14 illustrated is of the type in which an actuating magnet (not shown) is trapped in the depending end of a closely wound spring 14' that is mounted at a threaded lower end (not shown) of probe 14, which usually is formed of a tough plastic or similar material. To adjust the transverse location of a probe 14, its depending portion is swung outwardly about the top edge bracket bar 68 sufficiently to clear the slotted edge of bracket flange 70 and then slid along bar 68 until it can be allowed to swing back into the locating slot at the position desired, which will be the position at which it will be located to pass over the floor-installed switch 16 it is to actuate. The switch 16 usually employed is of the magnetically sensitive reed type, which operates through relays when actuated to set in motion suitable mechanisms that perform the cart switching.

In order to present the magnetic probe 14 effectively for actuation of such a switch 16, it is necessary that the lower end of the probe travel at a spacing no greater than about three-eights inch above the floor level, which is must too close whenever a cart is removed from the dragline system for manual handling, and for this reason it is necessary in turn to provide for disposing the probes 14 at a lowered switch-actuating position whenever a cart is traveling in the dragline system, and for retracting them to a sufficiently raised position to keep them clear of any likely harm whenever a cart is being handled normally apart from the dragline system.

From the raised position at which the control tube 60 is normally biased as seen in FIGS. 9 and 10, the probes 14 can be conveniently lowered to present them at actuating position by bearing downwardly with the foot on the probe bracket flange 70 in the region of the control tube 60. Force applied in this way will cause the entire probe bracket 66 together with the control tube 60 to move downwardly against the bias of guide pin springs 56 until an aligned lengthwise slot 72 is brought slightly below coincidence with the previously mentioned guide tube slot 52. When this happens an upwardly extending latching lever 74, that is pivoted at 76 and biased by a coil spring 78 within a housing 80 carried by control tube 60 (see FIGS. 3, 4 and 5), will have access to the guide tube slot 52 through the control tube slot 72 and will tend to lodge therein under the bias of coil spring 78 (see FIGS. 2 and 8).

However, the latching lever 74 has a knee formation intermediate its length at which an upper end portion 74' is angled to assume a position parallel to the axis of guide tube 24 whenever it is lodged in guide tube slot 52, and the length of upper end latch portion 74' is such that the knee formation thereat prevents lodging in the guide tube slot 52 whenever the drop pin sleeve 46 (or the alternative collar) is in blocking position. Accordingly, the drop pin 10 must be at lowered position in order to latch the probes 14 downwardly, so that it is never possible to effect such latching when a cart has been removed from the dragline system. But if the drop pin 10 has been lowered for engaging the dragline system, the guide tube slot 52 will be clear and the upper end latch portion 74' will engage therein to hold the probes 14 lowered for switch actuation as long as drop pin 10 is kept at lowered position.

Upon raising drop pin 10 to retract it, however, the upper end of drop pin sleeve 46 (or the alternative collar) will strike the latching lever 74 at its knee formation and dislodge the upper end latch portion 74' to release control tube 60 and cause the probes 14 to retract as well. Thus, the probes 14 are always released for independent retraction whenever drop pin 10 is raised, and lowered position latching of probes 14 is always prevented unless the drop pin 10 is at lowered position, to provide the cart handling advantages noted earlier.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. In a cart structure of the type employed in dragline systems and incorporating a drop pin for engaging the dragline and at least one probe for actuating system switches, the improvement which comprises a guide tube fixed uprightly on said cart structure and in which said drop pin is positioned for lowering to engage said dragline and raising to retract the same, a control tube slidably telescoped on said guide tube and on which means for carrying said probe is fixed, means biasing said control tube toward an upward position at which said probe is retracted, means for latching said control tube at a lowered position at which said probe is presented for switch actuation, and means carried by said drop pin for releasing said latching means whenever said drop pin is raised from lowered position and for preventing lowered position latching of said control tube unless said drop pin is at lowered position.

2. In a cart structure, the improvement defined in claim 1 and further characterized in that said control tube biasing means is carried by said guide tube and additionally acts to restrict said control tube against rotation on said guide tube.

3. In a cart structure, the improvement defined in claim 2 and further characterized in that said guide and control tubes are formed with aligned lengthwise slots that are longitudinally related for coincidence only when said control tube is at lowered position, and in that said control tube latching means is biased for engaging said guide tube slot when said control tube is depressed to said lowered position.

4. In a cart structure, the improvement defined in claim 3 and further characterized in that said means for releasing the control tube latching means is a sleeve portion carried by said drop pin to present an upwardly facing latch dislodging shoulder, and in that said sleeve portion is of sufficient length and is positioned on said drop pin to prevent lodging of said latching means in said guide tube slot unless said drop pin is in lowered position.

5. In a cart structure, the improvement defined in claim 4 and further characterized in that said control tube latching means is an upwardly extending lever pivoted on said control tube and having a knee formation angling an upper end portion of said lever to assume a position parallel to the axis of said guide tube when lodged in the slot thereof and preventing such lodging when said slot is blocked by said sleeve portion.

* * * * *